(12) United States Patent
Verdun

(10) Patent No.: US 7,647,515 B2
(45) Date of Patent: Jan. 12, 2010

(54) SYSTEM AND METHOD FOR INFORMATION HANDLING SYSTEM ADAPTIVE VARIABLE BUS IDLE TIMER

(75) Inventor: Gary Verdun, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 501 days.

(21) Appl. No.: 11/215,260

(22) Filed: Aug. 29, 2005

(65) Prior Publication Data

US 2007/0050653 A1 Mar. 1, 2007

(51) Int. Cl.
G06F 1/26 (2006.01)
G06F 1/32 (2006.01)

(52) U.S. Cl. .................. 713/320; 713/300; 713/323; 713/324; 713/330; 455/522; 710/107

(58) Field of Classification Search ............. 713/320, 713/300, 323, 324, 330; 455/522; 710/107
See application file for complete search history.

(56) References Cited

U.S. PATENT DOCUMENTS

| | | | |
|---|---|---|---|
| 6,480,476 B1* | 11/2002 | Willars | 370/311 |
| 6,516,421 B1* | 2/2003 | Peters | 713/502 |
| 7,006,852 B2* | 2/2006 | Morioka et al. | 455/574 |
| 7,028,199 B2* | 4/2006 | Ayyavu et al. | 713/323 |
| 7,450,959 B2* | 11/2008 | Lin et al. | 455/550.1 |
| 2002/0057019 A1 | 5/2002 | Moran | 307/85 |
| 2002/0112191 A1 | 8/2002 | Pelissier et al. | 713/300 |
| 2003/0135676 A1* | 7/2003 | Jensen | 710/107 |
| 2004/0003297 A1 | 1/2004 | Ma | 713/300 |
| 2004/0225801 A1 | 11/2004 | Scordalakes et al. | 710/302 |
| 2005/0022035 A1 | 1/2005 | Hsu | 713/300 |
| 2005/0022036 A1 | 1/2005 | Hsu | 713/300 |
| 2006/0069930 A1* | 3/2006 | Dixon et al. | 713/300 |

* cited by examiner

*Primary Examiner*—Thomas Lee
*Assistant Examiner*—Michael J Brown
(74) *Attorney, Agent, or Firm*—Hamilton & Terrile, LLP; Robert W. Holland

(57) ABSTRACT

Power management of an information handling system PCI Express bus dynamically adjusts the inactivity time at the bus that is determined before initiation of a low power state by analyzing the transitions between low power and operating states over time. Dwell times of the bus in the low power state are compared with an inactivity goal to determine if the inactivity time should be adjusted up, such as when the bus enters the low power state too often, or should be adjusted down, such as when the bus enters the low power state too infrequently. In one embodiment, the dwell time is the time from entry into a low power state until initiation of the transition to an operating state and the inactivity goal is the time required for the bus to enter and exit the low power state.

17 Claims, 2 Drawing Sheets

SYSTEM AND METHOD FOR INFORMATION HANDLING SYSTEM ADAPTIVE VARIABLE BUS IDLE TIMER

BACKGROUND OF THE INVENTION

1. Field of the Invention

The present invention relates in general to the field of information handling system power management, and more particularly to a system and method for information handling system adaptive variable bus idle timer.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system performance has steadily increased over time as processing components have increased their ability to process greater amounts of information in reduced amounts of time. Another factor to improved information handling system performance is the greater speeds at which buses within information handling systems are able to communication information between processing components. For example, the recently introduced PCI Express bus communicates information at rates that are considerably more rapid than its predecessor PCI bus. Generally, the more rapid processing and communication of information occurs due to the increased number of transistor devices integrated within processing components to perform processing operations and the greater number of operating cycles that the processing components run per operating time period. However, the ability of processing components within an information handling system to more rapidly process information typically means that the amount of power used by the information handling system also increases. For portable information handling systems that operate on internal battery power having limited duration, the increased power consumption often translates into reduced battery life for a give battery charge.

One method for reducing power consumption of an information handling system is to place processing components in an idle state when the processing components are inactive. As an example, the PCI Express standard defines an Active State Power Management (ASPM) protocol in which transmission of characters over a PCI Express link are stopped during idle periods in order to reduce power during times of inactivity. The ASPM protocol states that an inactivity timer set at a value determinable by the processing component manufacturer determines when the communication link should transition to a low power state. Before the transition to the low power state, the PCI Express link transmits characters during times of inactivity in order to maintain the serial link synchronization, such as the synchronization of a phased lock loop (PLL). In the idle state, link synchronization is sacrificed for power savings and re-established once the link becomes active again. However, re-establishing synchronization of a PCI Express link takes some time and thus introduces some delay in the communication of information across the link. An ideal inactivity timer value for assertion of low power states at a PCI Express link depends upon link traffic patterns which vary widely depending upon the type of components involved, system activity, the application being run or other factors. Component manufacturers are motivated to select an inactivity timer value that minimizes the impact on component performance or is optimized for a give set of conditions that may differ substantially from actual operating conditions.

SUMMARY OF THE INVENTION

Therefore a need has arisen for a system and method which adapts a bus inactivity timer value to variable operating conditions.

In accordance with the present invention, a system and method are provided which substantially reduce the disadvantages and problems associated with previous methods and systems for setting a bus inactivity timer value. Bus activity is analyzed to determine an activity threshold for initiating bus power down states. Adaptive variable bus power downs balance information handling system power conservation and performance goals.

More specifically, a power manager monitors a PCI Express bus for idle communication periods greater than an inactivity timer value to place the bus in a power down state and recovers the bus from the power down state upon initiation of communication on the bus. An activity analyzer analyzes one or more factors to dynamically adapt the inactivity timer value to variable operating conditions of the bus. For instance, a dwell timer times the duration of power down states, such as the time from entry until the initiation of a return to a normal operating state, and an inactivity engine compares dwell times with a desired goal value to adjust the inactivity timer value. As an example, the inactivity engine adjusts the inactivity timer to maintain the median dwell time at a value substantially equal to the time required to enter and exit the low power state.

The present invention provides a number of important technical advantages. One example of an important technical advantage is that power conservation and bus performance of an information handling system are balanced for an improved user experience. Dynamic adjustment of the sensitivity of the bus to idle time for the entry of a power down state adjusts system performance to varying conditions for optimal performance with minimal power consumption. Adjustable PCI Express inactivity timer values for each of plural buses of a portable information handling system improves battery charge life while minimizing the affect on component performance for varying operating conditions of the various components of an information handling system.

BRIEF DESCRIPTION OF THE DRAWINGS

The present invention may be better understood, and its numerous objects, features and advantages made apparent to those skilled in the art by referencing the accompanying

DETAILED DESCRIPTION

Power conservation and performance of an information handling system PCI Express bus are balanced by adapting the inactivity timer value for transition to a power down state to take in account variable and changing operating conditions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
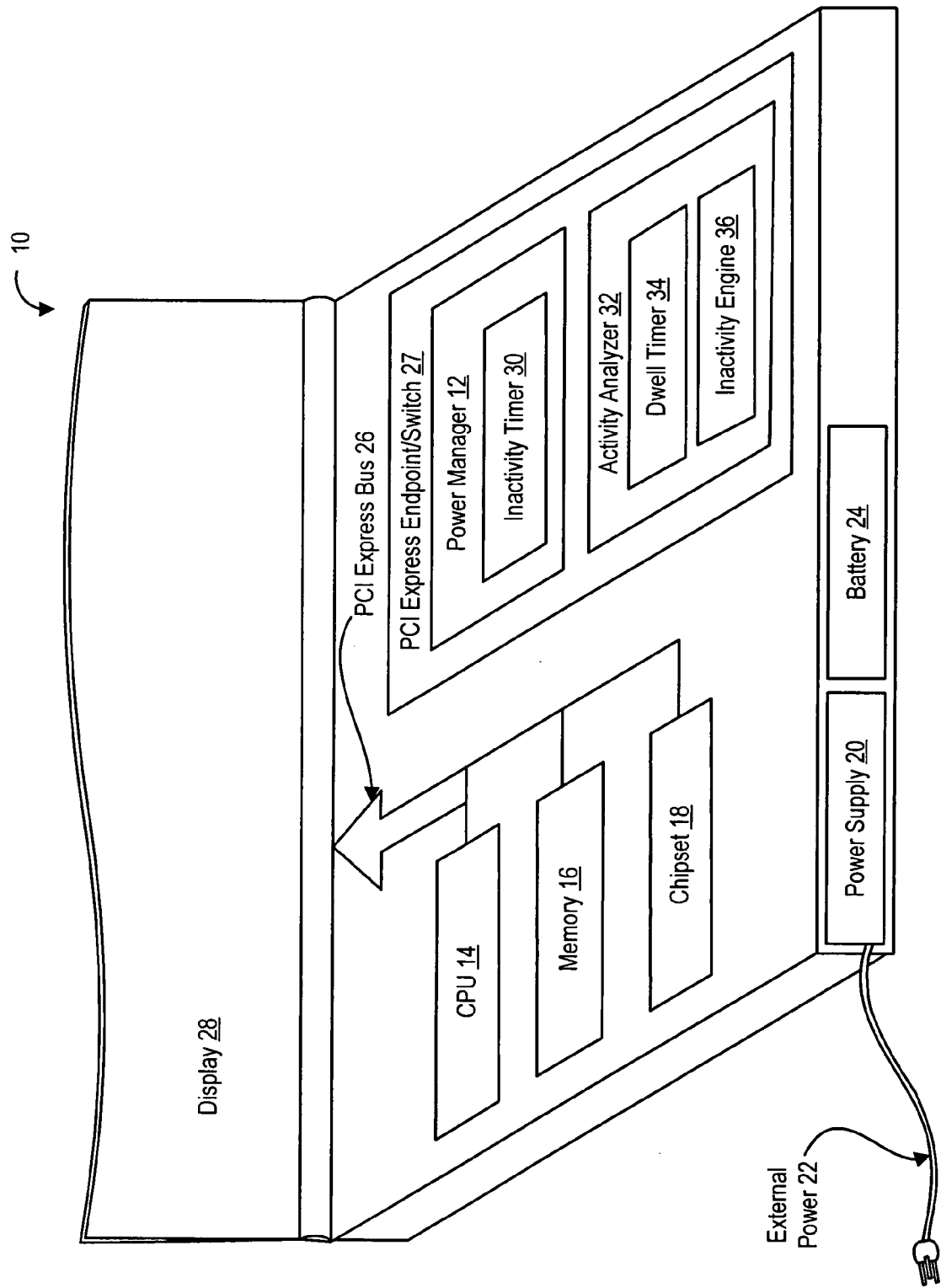
FIG. 1 depicts a block diagram of a portable information handling system having an adaptive variable PCI Express power manager.

Referring now to FIG. 1, a block diagram depicts a portable information handling system 10 having an adaptive variable PCI Express power manager 12. Portable information handling system 10 has plural processing components to process information, such as a CPU 14, memory 16 and chipset 18. The processing components operate with power from a power supply 20 that supplies power received from an external source 22 or an internal battery source 24 having a charge of limited duration. Information is communicated between at least some of the processing components through a PCI Express bus 26 supported by a PCI Express endpoint/switch 27, such as to present the information on a display 28. PCI Express power manager 12 resides in endpoint/switch 27 to manage power usage of information handling system 10 by, for instance, placing inactive or idle processing components into one or more types of power down states until the components become active and then returning the components to an operational state to perform desired functions. Power manager 12 is, for instance, hardware or firmware running on endpoint/switch 27.

Power manager 12 reduces power consumption of PCI Express bus 26 by placing PCI Express bus 26 in a power down state if the bus is determined as idle for an inactivity timer value in an activity timer 30. For instance, power manager 12 monitors activity on PCI Express bus 26 by tracking information communicated through bus 26 other than synchronization information. If no information is detected before expiration at inactivity timer 30 of the inactivity time value, then power manager 12 transitions PCI Express bus 26 to a low power state. When activity is again detected, such as an attempt to send information across bus 26, power manager 12 transitions bus 26 to an active state by re-establishing synchronization. The setting for the inactivity timer value is dynamically adjusted over time by an activity analyzer 32. Activity analyzer 32 analyzes a variety of factors to adjust the inactivity timer value to achieve a desired balance between power consumption and bus performance. For instance, activity analyzer 32 has a dwell timer 34 that measures time values related to the transitions between low power and operating states, such as the length of time that bus 26 is in a low power state before initiation of transition to an operating state. The dwell time measured by dwell timer 34 is analyzed by inactivity engine 36 to determine an adjusted inactivity timer value for inactivity timer 30. For example, inactivity engine incrementally adjusts the inactivity timer value to attempt to maintain a desired average dwell time over a given operating period. In alternative embodiments, other factors used to determine the inactivity timer value include the type of application run on the system, the use of internal or external power sources, and various measures of the rate and timing of information transfers across the bus.

Figure 2:
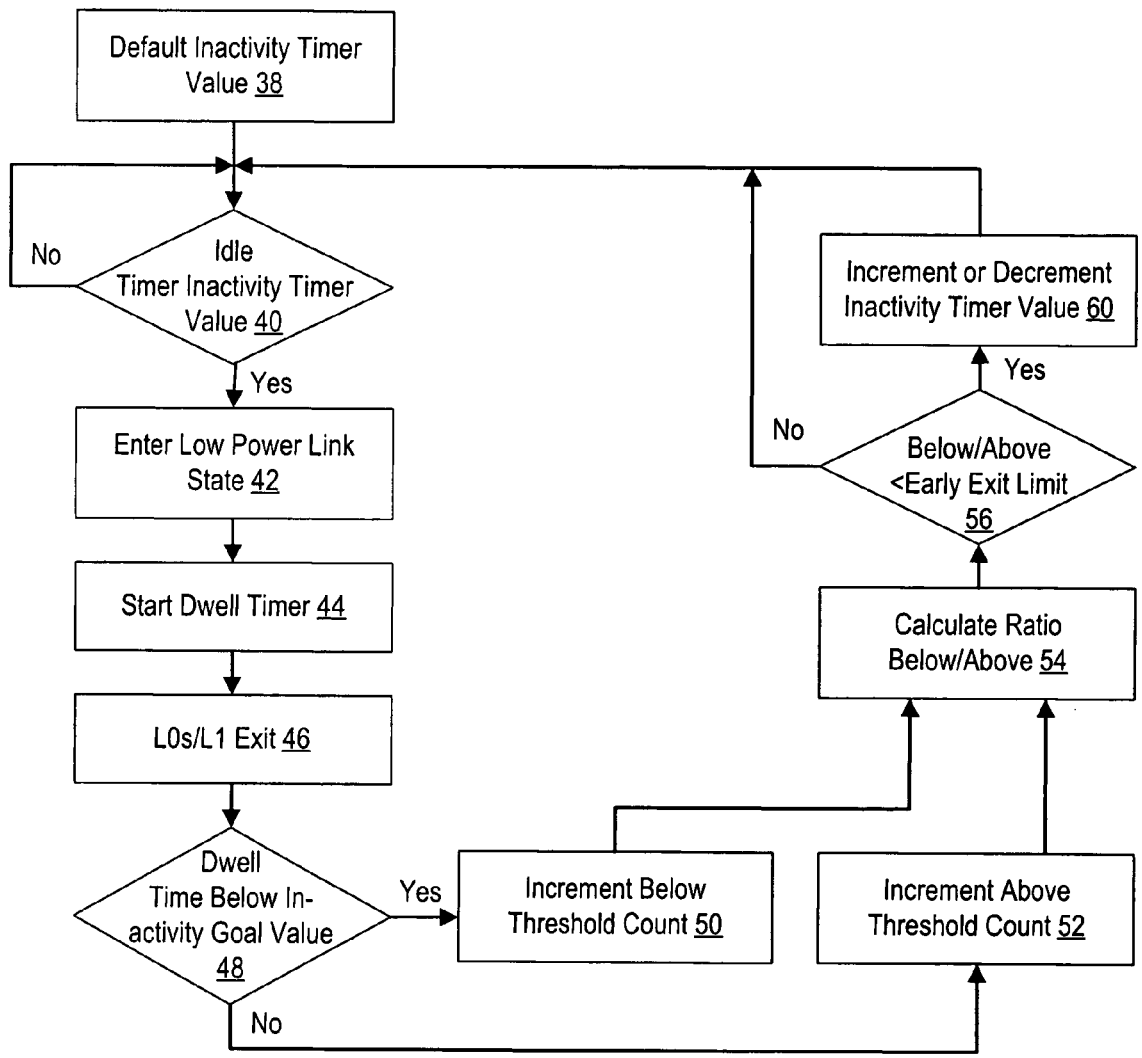
FIG. 2 depicts a flow diagram of one example of a method for adapting the inactivity timer of a PCI Express bus power manager.

Referring now to FIG. 2, a flow diagram depicts one example of a method for adapting the inactivity timer of a PCI Express bus power manager in response to bus activity. The process begins at step 38 with the inactivity timer value set at a default value. At step 40, the idle time of inactivity on the bus is compared with the inactivity timer value in monitoring loop until the idle time exceeds the inactivity timer value. Once the idle time exceeds the inactivity timer value, the process continues to step 42 for entry of the bus into a low power state. At step 44, the dwell timer is started to measure the time spent by the bus in the low power state until, at step 46, a request for communication of information across the bus results in initiation of recovery from the low power state. At step 48, the dwell time is compared with an inactivity goal value. Dwell times that are below the inactivity goal value proceed to step 50 for an increment added to a counter for a below threshold count and dwell times that exceed the inactivity goal value proceed to step 52 for an increment added to a counter for an above threshold count. At step 54, the above and below threshold counts for a predetermined operational time are divided into each other to determine a ratio that illustrates whether the majority of dwell times are greater than or less than the inactivity goal.

At step 56, the ratio of dwell times above and below the inactivity goal time is analyzed to determine if the inactivity timer is causing too many low power periods for which the dwell time is below the activity goal value. For instance, the inactivity goal value is set substantially at the time required for entry into and exit from the low power state. If a dwell time is less than the time required to enter and exit the low power state, then little or no power savings is experienced for the performance impact sustained. However, if the dwell time is greater than the time required to enter and exit the low power state, at least some power savings is achieved. By tracking bus performance statistics over time, the relative impact of the inactivity timer value is determined so that the inactivity timer value is adjusted to meet desired performance goals. At step 60, for instance, the inactivity timer value is incremented to a greater value if the dwell times are low to achieve fewer low power states after greater inactivity delays, or, the inactivity timer value is decremented to a lower value if the dwell times are high to achieve more low power states with lesser inactivity delays. The process then continues to step 40 to continue monitoring bus activity to detect idle periods in excess of the adjusted inactivity timer value. In alternative embodiments, a variety of factors may be considered in setting a desired inactivity goal and timer value, including time in power down states, time in normal operating states, frequency and quantity of bus activity, applications in use and other factors predictive of bus use.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information;
   a bus interfaced with the plural processing components and operable to communicate information between the processing components;
   a power manager interfaced with the bus and operable to transition the bus to a low power state during idle periods and transition the bus to an operable state to support active communication; and
   an activity analyzer interfaced with the power manager and operable to monitor communication of information across the bus to determine an activity level for the power manager to set the low power state;
   wherein the activity analyzer comprises:
   an inactivity timer interfaced with the power manager, the timer having an inactivity value, the timer commanding the low power state if bus communication is inactive for the inactivity value;
   a dwell timer interface with the power manager, the dwell timer operable to determine a dwell time value for the length of each low power state; and
   an inactivity engine interfaced with the inactivity timer and the dwell timer, the inactivity engine operable to compare the dwell time value with a predetermined inactivity goal value to adjust the inactivity value.

2. The information handling system of claim 1 wherein the activity analyzer is further operable to dynamically adjust the activity level for the power manager to set the low power state in response to changes in the communication of information across the bus.

3. The information handling system of claim 2 wherein the bus comprises a PCI Express bus.

4. The information handling system of claim 2 wherein the activity analyzer monitors the idle time between communication of information across the bus.

5. The information handling system of claim 2 wherein the activity analyzer monitors the time in the low power state.

6. The information handling system of claim 1 wherein the predetermined inactivity goal value is a time substantially equal to the time required to enter and exit the low power state.

7. The information handling system of claim 6 wherein the inactivity engine is further operable to compare the ratio over time of dwell times greater than the inactivity goal value versus dwell times less than the inactivity goal.

8. The information handling system of claim 6 wherein the inactivity engine is further operable to compare the ratio over time of the number of dwell times greater than the inactivity goal versus the number of dwell times less than the inactivity goal.

9. A method for managing power consumption by an information handling system bus, the method comprising:
   monitoring the bus in an operational state for inactivity;
   transitioning the bus to a low power state if inactivity on the bus exceeds an inactivity time value;
   transitioning the bus from the low power state to the operational state in response to activity; and
   analyzing the transitions to and from the low power state to dynamically adjust the inactivity time value, analyzing the transitions further comprising comparing the period in time of the low power state against a predetermined inactivity goal.

10. The method of claim 9 wherein the bus comprises a PCI Express bus.

11. The method of claim 9 wherein analyzing the transitions further comprises analyzing the period of time of the low power state.

12. The method of claim 9 wherein analyzing the transitions further comprises monitoring the period of time of inactivity between communication of information across the bus.

13. The method of claim 9 wherein the inactivity goal comprises the time required to transition to and from the low power state.

14. The method of claim 13 wherein analyzing further comprises analyzing plural transitions to and from the low power state.

15. A system for managing power consumption by an information handling system bus, the system comprising:
   a power manager operable to transition the bus to a low power state upon determination of bus inactivity for predetermined inactivity time and to transition the bus to an operating state upon determination of bus activity; and
   an activity analyzer interfaced with the power manager and operable to dynamically adjust the predetermined inactivity time in accordance with one or more predetermined factors;
   wherein the activity analyzer adjusts the predetermined activity time by:
   determining the dwell time from entry of the low power state to initiation of the transition to the operating state;
   comparing the dwell time with a predetermined inactivity goal;
   adjusting the predetermined inactivity time so that the ratio of dwell times above and below the inactivity time meets a predetermined ratio goal.

16. The system of claim 15 wherein the bus comprises a PCI Express bus.

17. The system of claim 16 wherein the predetermined factors comprise the length of time of the bus inactivity.

* * * * *

UNITED STATES PATENT AND TRADEMARK OFFICE
CERTIFICATE OF CORRECTION

PATENT NO.        : 7,647,515 B2
APPLICATION NO. : 11/215260
DATED             : January 12, 2010
INVENTOR(S)       : Gary Verdun It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Sixteenth Day of November, 2010

David J. Kappos
*Director of the United States Patent and Trademark Office*